US009129090B2

(12) United States Patent
Cozart et al.

(10) Patent No.: US 9,129,090 B2
(45) Date of Patent: Sep. 8, 2015

(54) DISTRIBUTED SERVICE POINT TRANSACTION SYSTEM

(75) Inventors: Dennis Cozart, Scottsdale, AZ (US); Lorcan McGuinness, Sioux Falls, SD (US)

(73) Assignee: BLACKBOARD INC., Washington, DC (US)

(*) Notice: Subject to any disclaimer, the term of this patent is extended or adjusted under 35 U.S.C. 154(b) by 1023 days.

(21) Appl. No.: 12/559,353

(22) Filed: Sep. 14, 2009

(65) Prior Publication Data

US 2011/0067028 A1 Mar. 17, 2011

(51) Int. Cl.
*G06F 15/16* (2006.01)
*G06F 21/10* (2013.01)
*G06Q 30/06* (2012.01)
*G07C 9/00* (2006.01)

(52) U.S. Cl.
CPC .............. *G06F 21/10* (2013.01); *G06Q 30/06* (2013.01); *G07C 9/00* (2013.01)

(58) Field of Classification Search
CPC .............. G06F 17/30861; G06F 21/34; G06F 21/6245; G06F 21/6263; G06F 21/79; H04L 63/08; H04L 67/02; H04L 9/28; G06Q 30/0253
USPC ......................................................... 709/229
See application file for complete search history.

(56) References Cited

U.S. PATENT DOCUMENTS

| | | | |
|---|---|---|---|
| 3,651,499 A * | 3/1972 | Hynes, Jr. .............. 360/1 |
| 6,213,391 B1 * | 4/2001 | Lewis ............ 235/380 |
| 6,549,951 B1 * | 4/2003 | Hui et al. ............ 709/250 |
| 6,633,223 B1 | 10/2003 | Schenker et al. |
| 6,876,293 B2 | 4/2005 | Frolov et al. |
| 7,305,473 B2 | 12/2007 | Vogt |
| 2002/0055881 A1 * | 5/2002 | Han ................ 705/26 |
| 2004/0068471 A1 * | 4/2004 | Kato ............... 705/51 |
| 2004/0187108 A1 * | 9/2004 | Knowles et al. ....... 718/100 |
| 2004/0230536 A1 * | 11/2004 | Fung et al. ......... 705/64 |
| 2005/0165686 A1 * | 7/2005 | Zack et al. ........ 705/51 |
| 2006/0235755 A1 * | 10/2006 | Mueller et al. ...... 705/15 |
| 2007/0294296 A1 * | 12/2007 | Silver et al. ........ 707/104.1 |

(Continued)

OTHER PUBLICATIONS

"System Center Configuration Manager—Wikipedia, the free encyclopedia", printed Sep. 29, 2009, (http://en.wikipedia.org/wiki/System_Center_Configuration_Manager).

*Primary Examiner* — Viet Vu
*Assistant Examiner* — James Edwards
(74) *Attorney, Agent, or Firm* — McDermott, Will & Emery LLP

(57) ABSTRACT

A device for processing electronic transactions is disclosed. The device includes a processor configured to receive, from a client processing device, a request for information to complete an electronic transaction by a user at an access device affiliated with an educational institution. The processor is further configured to transmit, to the client processing device, a response to the request, the response configured to be transmitted by the client processing device to the access device. The request for information is triggered at the access device by an identification carrier. The response to the request includes at least one of a permission or denial whether to provide, to the user, access to an educational space or item, access to electronic educational information, or determining at least one of the price and availability of an educational item to the user. A client-side device is also disclosed. Methods and machine-readable mediums are also disclosed.

24 Claims, 5 Drawing Sheets

(56) References Cited

U.S. PATENT DOCUMENTS

| | | |
|---|---|---|
| 2008/0019569 A1 | 1/2008 | Rhoads et al. |
| 2008/0072064 A1* | 3/2008 | Franchi .................... 713/186 |
| 2008/0114923 A1* | 5/2008 | In et al. .................... 711/103 |
| 2008/0294584 A1 | 11/2008 | Herz |
| 2009/0280468 A1* | 11/2009 | Yaskin ...................... 434/362 |
| 2009/0281873 A1* | 11/2009 | Yaskin ........................ 705/10 |
| 2011/0125613 A1* | 5/2011 | Franchi ...................... 705/27.1 |
| 2012/0210119 A1* | 8/2012 | Baxter et al. .............. 713/150 |

* cited by examiner

DISTRIBUTED SERVICE POINT TRANSACTION SYSTEM

BACKGROUND

1. Field

The present disclosure generally relates to systems and methods for the processing of electronic transactions, and specifically, to the processing of electronic transactions over a network.

2. Description of the Related Art

Educational institutions and private corporations often provide many types of services on their campuses to students, employees, and others ("users"), using a central service point system to process electronic transactions. The electronic transactions, which include requests for access to physical spaces or items (e.g., accessing a room), access to electronic information (e.g., viewing a transcript online), and determining at least one of the price and availability of an item (e.g., how much a book costs and if a student can purchase it), are often initiated by the users at a point of service device ("device"). The devices generate the electronic transactions (e.g., a request by a user to access a room, view a transcript online, or purchase a book) that are transmitted to the central service point so that the central service point can provide a response to the request to the devices (e.g., permission or denial whether to provide access to the room, to view the transcript online, or purchase a book at a certain price). As discussed herein, an educational space or item includes, without limitation, a space or item that is associated with an educational environment or purpose (e.g., lecture room, file room, educational building, sports field, bookstore, exercise facility, recreational facility). As discussed herein, electronic educational information includes, without limitation, information that is associated with a user's account at an educational institution (e.g., transcripts, exams, homework, progress report, course materials, class roster, financial transactions, etc.). As discussed herein, an educational item includes, without limitation, an item associated with an educational institution (e.g., text book, syllabus, retail product at the educational facility's store).

The central service point is usually in a remote location to the campus so that the central service point can be hosted and maintained by another entity (the "host"). Consequently, requests for information from the devices are transmitted from the campus to the host's remote location, and responses to the requests are transmitted back to the campus from the host's remote location. As a result, a large volume of network traffic is generated between the campus and the remote location, which may burden the network connection between the campus and the remote location and increase the time required for providing a response. Some of this network traffic may reflect duplicate requests for information.

Additionally, if the network connection between the campus and the host's remote location is slow or unavailable, the requests may not be received at the remote location, and the responses may not be received at the campus. Furthermore, if a firewall is put in place, such as by the central service point at the host's remote location, requests from the devices may not be properly received by the central service point if the network traffic comprising the requests cannot be identified when transmitted from the campus or when received by the central service point.

SUMMARY

According to certain embodiments of the present disclosure, the disclosed systems and methods deal generally with the distribution of information for addressing electronic transactions, allowing multiple service points to be available to respond to requests for information by devices on a campus. In certain embodiments, a primary service point is located at the host's remote location, while a secondary service point, configured to handle a majority of requests, is located on the campus. Consequently, responses to requests for information from a device can be provided quickly and more efficiently (e.g., locally on campus), without the need to communicate over a network connection with a service point at the host's remote location. The secondary service point is configured to address duplicate requests for information. The secondary service point is further configured to handle all requests transmitted to the remotely located primary service point, such that the primary service point and secondary service point can be configured to identify network traffic with one another and thereby avoid the loss or delay of requests due to a firewall.

In certain embodiments of the disclosure, a device for processing electronic transactions is provided. The device includes a processor configured to receive, from a client processing device, a request for information to complete an electronic transaction by a user at an access device affiliated with an educational institution. The processor is further configured to transmit, to the client processing device, a response to the request, the response configured to be transmitted by the client processing device to the access device. The request for information is triggered at the access device by an identification carrier. The response to the request includes at least one of a permission or denial whether to provide, to the user, access to an educational space or item, access to electronic educational information, or determining at least one of the price and availability of an educational item to the user.

In certain embodiments of the disclosure, a device for processing electronic transactions is provided. The device includes a processor configured to receive, from a server processing device, a response to a request for information to complete an electronic transaction by a user at an access device affiliated with an educational institution. The device also includes a memory configured to store the response to the request. The processor is further configured to transmit, to the access device, the response to the request. The request for information is triggered at the access device by an identification carrier. The response to the request includes at least one of a permission or denial whether to provide, to the user, access to an educational space or item, access to electronic educational information, or determining at least one of the price and availability of an educational item to the user.

In certain embodiments of the disclosure, a method for processing electronic transactions, is provided. The method includes receiving, from a client processing device, a request for information to complete an electronic transaction by a user at an access device affiliated with an educational institution. The method also includes transmitting, to the client processing device, a response to the request, the response configured to be transmitted by the client processing device to the access device. The request for information is triggered at the access device by an identification carrier. The response to the request includes at least one of a permission or denial whether to provide, to the user, access to an educational space or item, access to electronic educational information, or determining at least one of the price and availability of an educational item to the user.

In certain embodiments of the disclosure, a method for processing electronic transactions, is provided. The method includes receiving, from a server processing device, a response to a request for information to complete an electronic transaction by a user at an access device affiliated with an educational institution. The method also includes storing, in memory, the response to the request, and transmitting, to the access device, the response to the request. The request for information is triggered at the access device by an identification carrier. The response to the request includes at least one of a permission or denial whether to provide, to the user, access to an educational space or item, access to electronic educational information, or determining at least one of the price and availability of an educational item to the user.

In certain embodiments of the disclosure, a machine-readable medium encoded with instructions for processing electronic transactions is provided. The instructions include code for receiving, from a client processing device, a request for information to complete an electronic transaction by a user at an access device affiliated with an educational institution. The instructions also include code for transmitting, to the client processing device, a response to the request, the response configured to be transmitted by the client processing device to the access device. The request for information is triggered at the access device by an identification carrier. The response to the request includes at least one of a permission or denial whether to provide, to the user, access to an educational space or item, access to electronic educational information, or determining at least one of the price and availability of an educational item to the user.

In certain embodiments of the disclosure, a machine-readable medium encoded with instructions for processing electronic transactions is provided. The instructions include code for receiving, from a server processing device, a response to a request for information to complete an electronic transaction by a user at an access device affiliated with an educational institution. The instructions also include code for storing, in memory, the response to the request, and transmitting, to the access device, the response to the request. The request for information is triggered at the access device by an identification carrier. The response to the request includes at least one of a permission or denial whether to provide, to the user, access to an educational space or item, access to electronic educational information, or determining at least one of the price and availability of an educational item to the user.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

There is a problem, in centralized service point systems that process electronic transactions from remote clients, of the electronic transactions being delayed or lost over a network connection between the centralized service point and the campus that includes the devices generating the electronic transactions. This and other problems are addressed and solved, at least in part, by embodiments of the present disclosure, which include a device for processing electronic transactions. The device includes a processor configured to receive, from a client processing device, a request for information to complete an electronic transaction by a user at an access device affiliated with an educational institution. The processor is further configured to transmit, to the client processing device, a response to the request, the response configured to be transmitted by the client processing device to the access device. The request for information is triggered at the access device by an identification carrier. The response to the request includes at least one of a permission or denial whether to provide, to the user, access to an educational space or item, access to electronic educational information, or determining at least one of the price and availability of an educational item to the user.

Figure 1A:
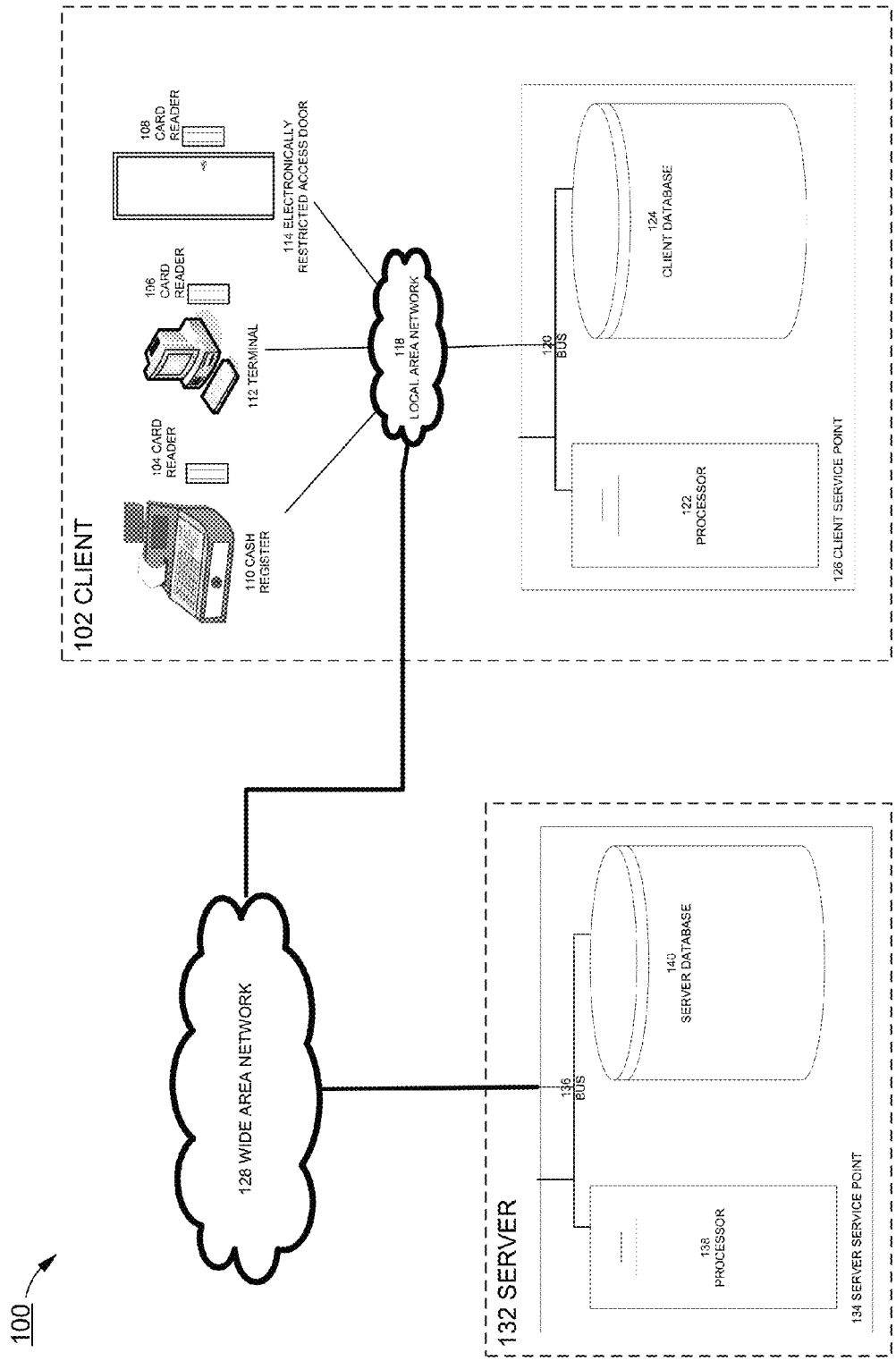
FIG. 1A is a diagram illustrating a distributed service point transaction for electronic transactions according to certain embodiments.

With reference to the drawings, which are provided by way of exemplification and not limitation, there are disclosed embodiments for processing electronic transactions using a multiple service point system. FIG. 1A is a diagram illustrating a distributed service point transaction 100 for electronic transactions. The distributed service point transaction 100 includes a server 132 connected to a client 102 over a wide area network 128, e.g., a packet-based network such as the Internet, or some other suitable network.

In certain embodiments, a client 102 as discussed herein is representative of an organization that occupies a physical space. For example, the client 102 as illustrated in FIG. 1A can be an educational institution or private corporation that conducts activities on a campus.

The client 102 includes a plurality of devices 110, 112, and 114 (e.g., "access devices") configured to communicate with a client service point 126 over a local area network 118, e.g., a private or network. The devices illustrated in FIG. 1A include a cash register 110, a terminal 112, and electronically restricted access door 114, each of which are associated with a card reader 104, 106, and 108, respectively. Many other types of devices compatible with the disclosed system 100 can be used, such as, without limitation, credit card authorization devices, vending machines, laundry machines, copy machines, printers, security monitoring devices, parking control devices, housing control devices, point of sale devices, and identification devices. Each of the devices 110, 112, and 114 can communicate within the distributed service point transaction 100 using a standard Internet interface including, but not limited to, TCP/IP, HTTP, SMTP, and FTP running on a standard computing platform such as a personal computer or workstation. For example, terminal 112 can include a shell service servlet that uses the URL-encoded information contained in HTTP requests received from a web browser on the terminal 112.

In certain embodiments, the devices 110, 112, and 114 are affiliated with an educational institution. As discussed herein, a device is affiliated with an educational institution if it is coupled to a network of the educational institution or receives information associated with the educational institution, such as, without limitation, a name, identification number, account number, or other identifier of a student, staff member, faculty member, or employee associated with the educational institution.

Each of the devices 110, 112, and 114 are configured to generate an electronic transaction based on information received at an input device, such as the card readers 104, 106, and 108 from an input provider (or "identification carrier," not shown), such as an electronic identification card provided by a user. The input provider can be any electronic identifier well known to those of skill in the art, including, without limitation, a radio frequency identifier (RFID), real time locating system (RTLS) identifier, key, infrared identifier, biometric identifier, voice identifier, or magnetic identifier. The information provided by the electronic identifier can include, without limitation, a name, gender, age, social security number, affiliation with an educational institution or business, status with said institution or business, password, account information, and credit or debit information.

As discussed herein, an electronic transaction includes a request by a device. For example, an electronic transaction can be a request to purchase an item at the cash register 110, initiated by the user swiping an electronic identification card through the card reader 104 associated with the cash register 110. As another example, an electronic transaction can be a request to provide a user with access to information stored on the terminal 112, initiated by the user swiping an electronic identification card through the card reader 106 associated with the terminal 112. As yet another example, an electronic transaction can be a request to provide access to a user to a physical space restricted by the access door 114, initiated by the user swiping an electronic identification card through the card reader 108 associated with the electronically restricted access door 114. Electronic transactions between the server 132 and client 102 can also include, without limitation, operation settings, communication settings, software updates, commands, status updates, and authorization commands.

The client 102 also includes at least one client service point 126 (or "client processing device") configured to communicate with the plurality of devices 110, 112, and 114 over the local area network 118. The client service point 126 includes a client database 124 that stores information responsive to a plurality of requests from a plurality of devices ("electronic transaction information") for processing electronic transactions using a processor 122, e.g., the client database 124 stores information responsive to requests from the devices 110, 112, and 114 received from the local area network 118 over a bus 120 connection, and processed by the processor 122. For example, if a user slides an identification card through card reader 108 indicating the user would like access through the electronically restricted access door 114, a request is sent from the electronically restricted access door 114 to the client service point 126 over the local area network 118 and the bus 120 connection, and the processor 122 of the client service point 126 processes the request with reference to the client database 124. Based on the information in the client database 124, the client service point 126 sends a response to the electronically restricted access door 114 indicating whether the user has access through the electronically restricted access door 114. The response may itself be indicated to the user by the electronically restricted access door 114, such as by unlocking the electronically restricted access door 114. If the client database 124 does not include information that is sufficient to provide a response to the request, the client service point 126 is configured to request information from the server service point 134, as discussed below with reference to FIG. 2. In certain embodiments, if a response to the request is not urgently needed, the client service point 126 can group requests and send them to the server service point 134 together, thereby controlling the use of the bandwidth of the connection between the client service point 126 and the server service point 134.

In certain embodiments, the client 102 includes a plurality of client service points 126. In certain embodiments, at least one of the plurality of client service points 126 is used to backup at least some of the information stored on another client service point 126. In certain embodiments, different client service points 126 include different information.

In certain embodiments, a server 132 as discussed herein is representative of an organization that is responsible for the server service point 134. For example, the server 102 as illustrated in FIG. 1A can be a third party provider responsible for the maintenance and support of the server service point 134.

The server service point 134 (or "server processing device") at the server 132 is connected to the client service point 126 at the client 102 over the wide area network 128 and the local area network 118. In certain embodiments, the server service point 134 is connected to the client service point 126 using one area network. In certain embodiments, both the wide area network 128 and the local area network 118 connect the server service point 134 to the client service point 126 using the Internet.

The server service point 134 includes a processor 138 and server database 140 connected via a bus 136. The server database 140 includes information responsive to a plurality of requests from a plurality of devices. For example, the server database 140 stores information indicating whether users have physical access through the electronically restricted access door 114, whether users have electronic access to the terminal 112, and whether users can purchase items at the cash register 110, and the cost of those items.

The server service point 134 is configured to process electronic transactions from client service point 126 using a processor 138. For example, if a user slides an identification card through card reader 108 indicating the user would like access through the electronically restricted access door 114, a request is sent from the electronically restricted access door 114 to the client service point 126. If the client service point 126 determines it does not have information sufficient to respond to the request, the client service point 126 sends the request to the server service point 134 at the server 132 over the wide area network 128 and the bus 136 connection of the server service point 132, to the processor 122 of the server service point 134. The processor 138 processes the request with reference to the server database 140. Based on the information in the server database 140, the server service point 134 sends a response to the electronically restricted access door 114 back to the client service point 126 over the wide area network 128 indicating whether the user has access through the electronically restricted access door 114. The client service point 126 then sends the response to the electronically restricted access door 114.

Figure 1B:
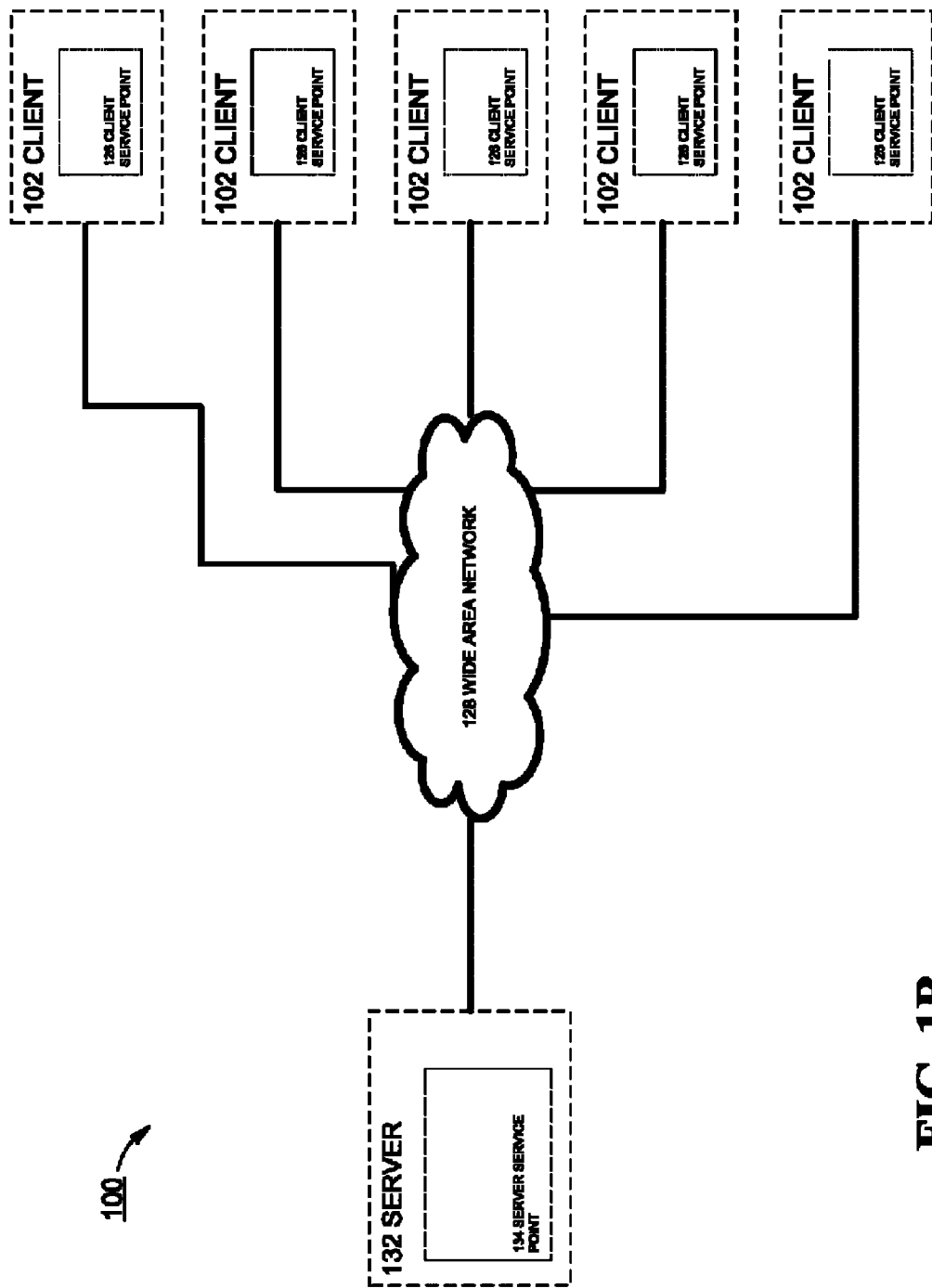
FIG. 1B is a diagram illustrating the distributed service point transaction of FIG. 1A including a plurality of clients.

The server service point 134 is configured to communicate with a plurality of clients 102, as shown in FIG. 1B. The distributed service point transaction 100 is thus scalable in that many clients 102 can be added to the system, with the processing burden of processing electronic transactions predominantly remaining with the client service points 128 of those clients 102, and not the server service point 134 of the server 132. The server service point 134 is further configured to process electronic transactions from a plurality of devices 110, 112, and 114, each associated with a plurality of clients 102.

In certain embodiments, the server 132 can include a plurality of server service points 134. In certain embodiments, at least one of the plurality of server service points 134 can be used to backup at least some of the information stored on another server service point 134. In certain embodiments, different server service points 134 can include different information.

In certain embodiments, the server service point 134 is configured to provide periodic updates of electronic transaction information from the server database 140 to the client database 124 of the client service point 126. The periodic updates can be prescheduled and/or automatic. For example, periodic updates can be prescheduled to occur every night, or once a week. The client database 124 can thus be updated with recent information from the server database 140 according to a schedule. By way of another example, periodic updates can be provided according to a policy system, such as by using the electronic transactions system disclosed in U.S. patent application Ser. No. 12/476,136, titled "Electronic Transactions System," which is incorporated in its entirety herein by reference.

In certain embodiments, the server service point 134 is also configured to manage the use of bandwidth on the wide area network 128 connection between the server 132 and the client 102. For example, the server service point 134 can control when and how much electronic transaction information to transmit during the periodic updates discussed above. Accordingly, when the server service point 134 determines that bandwidth needs to be conserved, the server service point 134 can either reduce the amount of electronic transaction information to transmit to the client service point 126 of the client 102 (e.g., by transmitting only frequently used electronic transaction information to the client service point 126), or decide to transmit the electronic transaction information at another time. Similarly, the client service point 126 can facilitate the management of bandwidth use by removing duplicate requests for information from the server 132, or requesting only frequently used electronic transaction information from the server 132.

The server service point 134 is yet further configured to manage information received at the server 132. For example, whereas previously in central service point systems requests were received from multiple devices, in the disclosed system 100 information is received from a single origin, the client service point 126, so that the server service point 134 can maintain a firewall restricting information (including requests for information) received from any other origin. Accordingly, network traffic from the client service point 126 does not need to be disguised or otherwise similarly configured for transmission from the client service point 126 to the server service point 134.

Figure 1C:
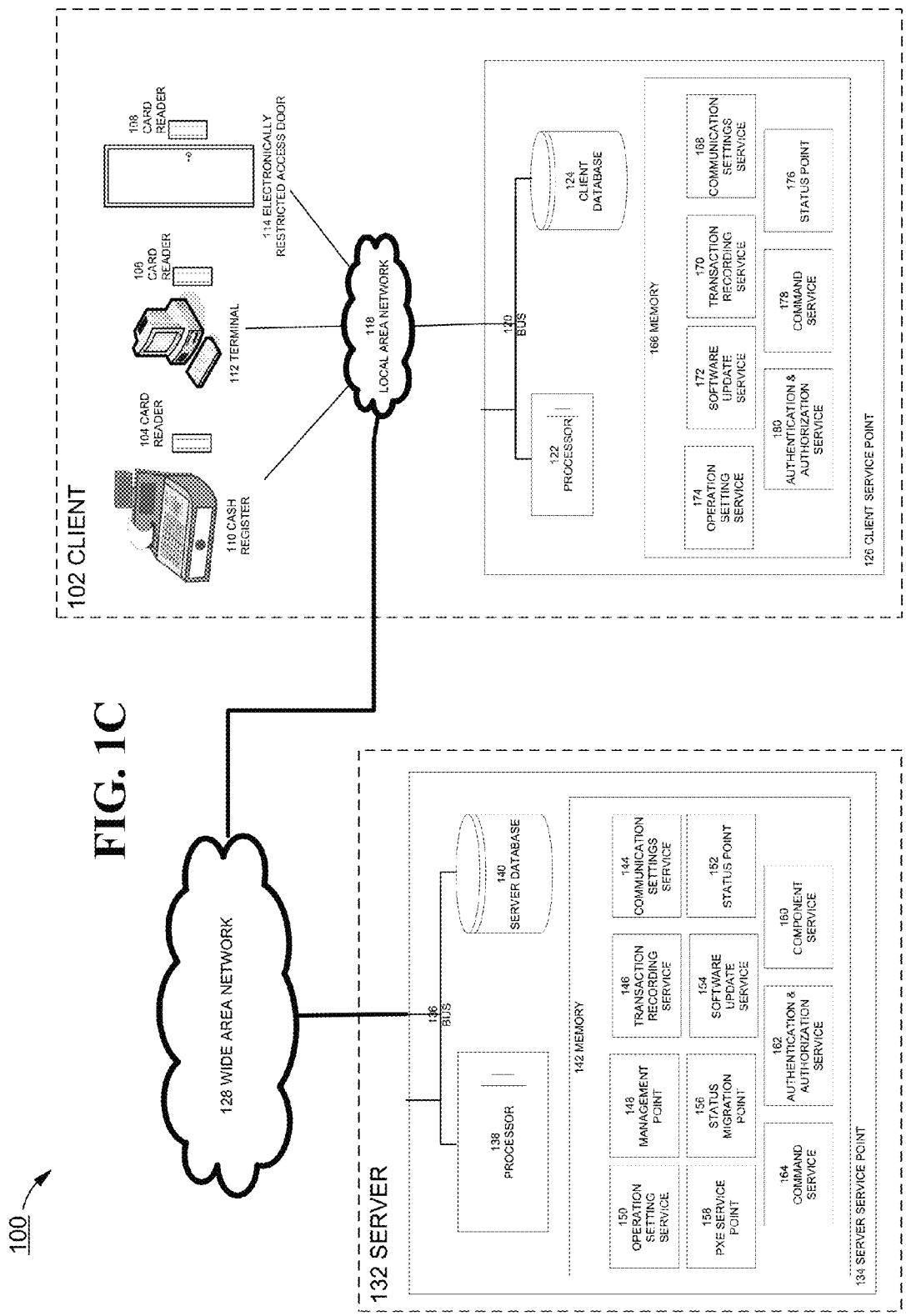
FIG. 1C is a diagram illustrating another distributed service point transaction for electronic transactions, according to certain embodiments.

As illustrated in FIG. 1C, in certain embodiments, the server service point 134 can include in memory 142 a transaction recording service 146 for recording transactions (e.g., from the client service point 128), communication settings service 144 for controlling communications (e.g., with the client service point 128), software update service 154 for providing software updates (e.g., to the client service point 128), and operation setting service 150 for setting operations (e.g., with the client service point 128). The server service point 134 can also include a component service 160 (e.g., to organize processing tasks), status point 152 (e.g., for receiving status messages from the client service point 128 when the client service point 128 has difficulty communicating with the server service point 134, and a management point 148. The management point 148 is a primary point of contact between the client service point 128 and the server service point 134. The management point 148 can provide the client service point 128 with installation prerequisites, installation files, configuration details, advertisements, and distribution point locations. The management point 148 can also receive inventory data, software metering information, and status messages from the client service point 128. The server service point 134 can further include a status migration point 156 for storing user state information before an operating system is deployed, and a preboot execution environment (PXE) service point 158 for responding to PXE boot requests from clients. The server service point 134 can yet further include a command service 164 (e.g., for issuing low-latency commands such as "unlock door"), and authentication and authorization service 162 (e.g., for providing user authentication, such as card and pin lookups, and providing user authorization, such as tracking account balances and outstanding obligations).

Similarly, in certain embodiments, the client service point 128 can in memory 166 include a transaction recording service 170 for recording transactions (e.g., from the transaction recording service 146 of server service point 134), communication settings service 168 for controlling communications (e.g., with the communication settings service 144 of the server service point 134), software update service 172 for receiving software updates (e.g., from the software update service 154 of the server service point 134), and operation setting service 174 for setting operations (e.g., with the operation setting service 150 of the server service point 134). The client service point 128 can also include a status point 176 (e.g., for communicating status messages to the management point 148 of the server service point 134), command service 178, and authentication and authorization service 180.

Figure 2:
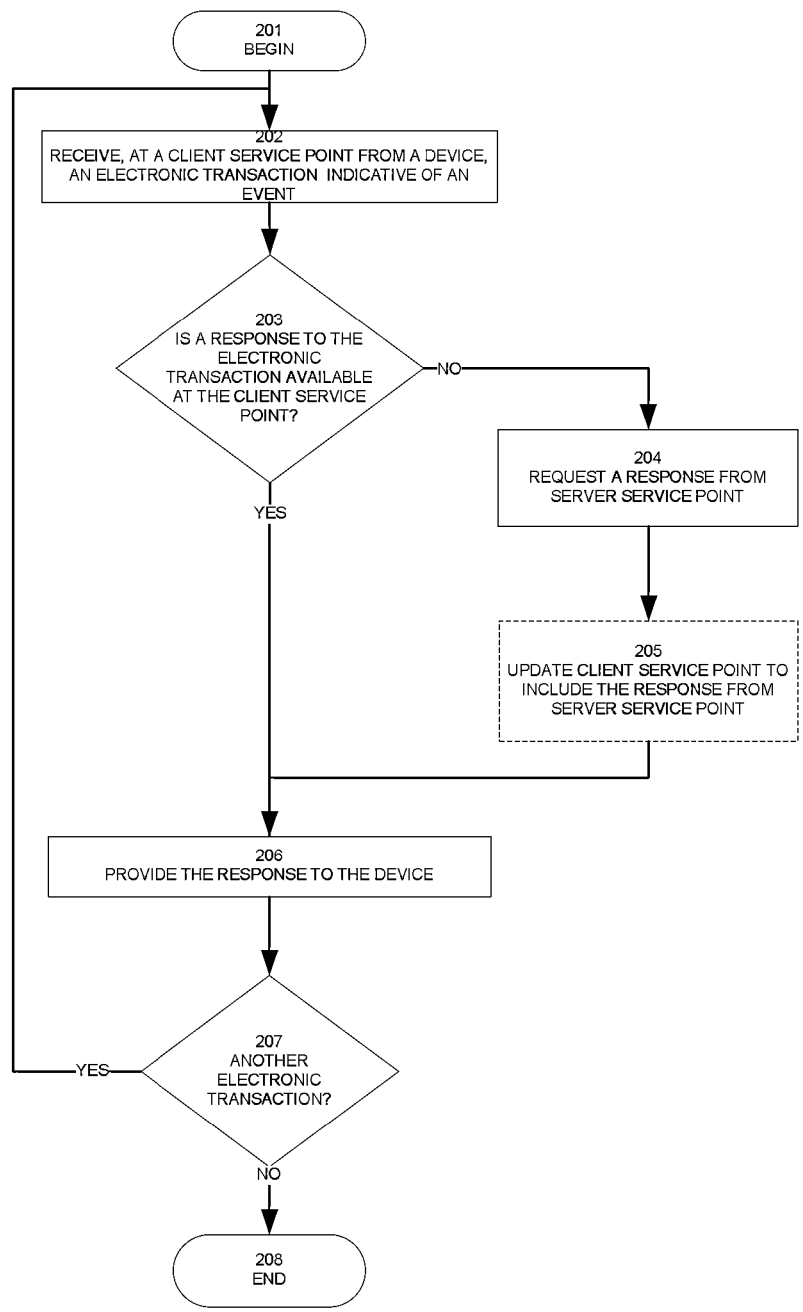
FIG. 2 is a flow chart illustrating an exemplary operation of processing an electronic transaction using the distributed service point transaction of FIG. 1A.

FIG. 2 is a flow chart illustrating an exemplary operation 200 of processing an electronic transaction at the client service point 126 of the distributed service point transaction 100 of FIG. 1A.

The process 200 begins from step 201 to step 202 in which event information indicative of an electronic transaction is received at client service point 126 from a device 110, 112, or 114. In step 203, if it is determined that a response to the electronic transaction is available at the client service point 126, then the process 200 moves to step 206 in which the response is provided to the device 110, 112, or 114. Otherwise, if it is determined that a response to the electronic transaction is not available at the client service point 126, then the process 200 moves to step 204 in which a response is requested from the server service point 134, and, optionally, the client service point 126 is updated to store the response from the server service point 134 in step 205. In step 206, the response is provided to the device 110, 112, or 114. In certain embodiments, if a response to the electronic transaction is not available at the client service point 126 in decision step 203, and a response is not provided by the server service point 134 in steps 204 and 205, then in step 206 the response provided to the device 110, 112, or 114 may be a default response, such as, for example, a default authorization for financial transactions (e.g., accepting a credit used to make a purchase) or a default rejection for access transactions (e.g., not providing access to a restricted area). If it is determined in decision step 207 another electronic transaction remains to be processed, then the process 200 returns to step 202, otherwise the process 200 ends in step 208.

Having set forth in FIG. 2 a process 200 by which an electronic transaction is processed at the client service point 126 of the distributed service point transaction 100 of FIG. 1A, an example will now be presented using the process 200 of FIG. 2 and cash register 110.

The process 200 begins from step 201 to step 202 in which, after a student user has slid his university identification card through the card reader 104 of the cash register 110 attempting to purchase a bottle of soda, event information indicative of a request by the user to purchase the soda is received at client service point 126 from the cash register 110. In step 203, it is determined that the client database 124 of the client service point 126 does not include information to respond to the request by the student to purchase the soda bottle, so the process 200 moves to step 204. In step 204, the client service point requests, from the server service point 134, the response to the student's request. The response, which indicates the student does have access to purchase the soda bottle and that the student's account will be debited $1, is provided to the client service point 126 over the wide area network 128 from the server database 140 of the server service point 134. In step 205 the client service point 126 stores the provided response in the client database 124, and in step 206, the response is provided to the cash register 110, allowing the user to complete the purchase transaction. It is determined in decision step 207 that no other electronic transactions remain to be processed, and the process 200 ends in step 208.

Figure 3:
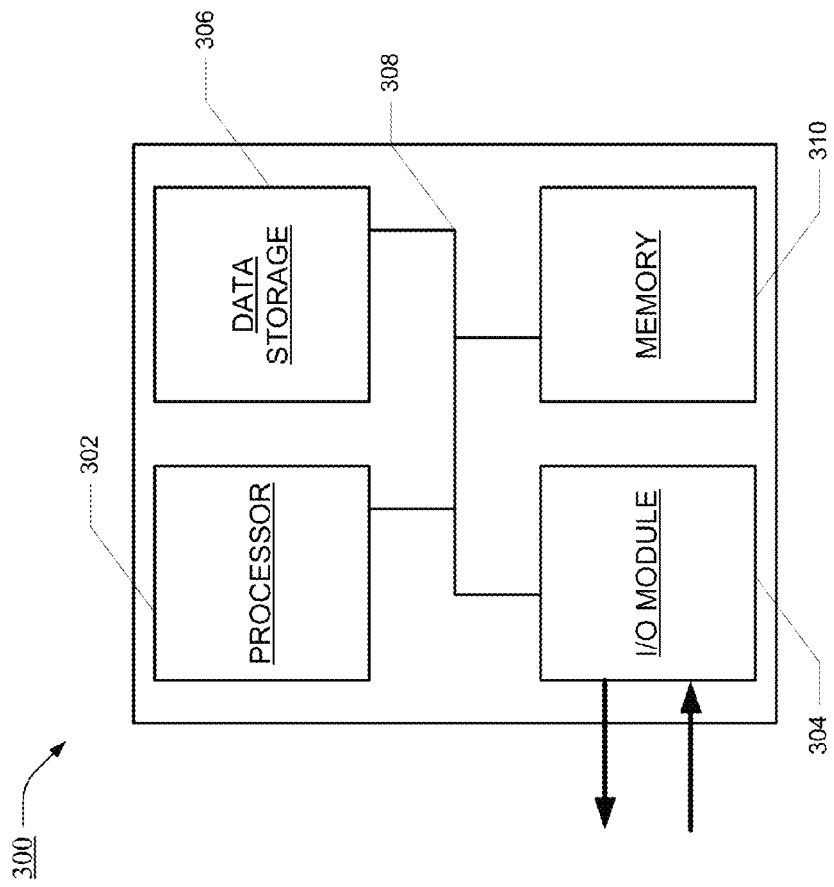
FIG. 3 is a block diagram illustrating an example of a computer system with which the distributed service point transaction of FIG. 1A can be implemented.

FIG. 3 is a block diagram illustrating an example of a computer system 300 with which the client service point 126 or the server service point 134 of the distributed service point transaction 100 of FIG. 1A can be implemented in accordance with one aspect of the present disclosure. In certain embodiments, the computer system 300 may be implemented using software, hardware, or a combination of both, either in a dedicated server, or integrated into another entity, or distributed across multiple entities.

Computer system 300 includes a bus 308 (e.g., communications bus 120 or 136 from FIG. 1A) or other communication mechanism for communicating information, and a processor 302 (e.g., processor 122 or 138 from FIG. 1A) coupled with bus 308 for processing information. By way of example, the computer system 300 may be implemented with one or more processors 302. Processor 302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Computer system 300 also includes a memory 310, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 308 for storing information and instructions to be executed by processor 302. The instructions may be implemented according to any method well known to those of skill in the art, including computer languages such as system languages (e.g., C, C++, Assembly), architectural languages (e.g., Java), and application languages (e.g., PHP, Ruby, Perl, Python). Memory 310 may also be used for storing temporary variable or other intermediate information during execution of instructions to be executed by processor 302. Computer system 300 further includes a data storage device 306 (e.g., client database 124 or server database 140 from FIG. 1A), such as a magnetic disk or optical disk, coupled to bus 308 for storing information and instructions.

Computer system 300 may be coupled via I/O module 304 to a display device, such as a cathode ray tube ("CRT") or liquid crystal display ("LCD") for displaying information to a computer user. An input device, such as, for example, a keyboard, or a mouse may also be coupled to computer system 300 via I/O module 304 for communicating information and command selections to processor 302.

According to one aspect of the present disclosure, the processing of electronic transactions may be implemented using a computer system 300 in response to processor 302 executing one or more sequences of one or more instructions contained in memory 310. Such instructions may be read into memory 310 from another machine-readable medium, such as data storage device 306. Execution of the sequences of instructions contained in main memory 310 causes processor 302 to perform the process steps described herein. One or more processors in a multi-processing arrangement may also be employed to execute the sequences of instructions contained in memory 310. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium or media that participates in providing instructions to processor 302 for execution. Such a medium may take many forms, including, but not limited to, non-volatile media, volatile media, and transmission media. Non-volatile media include, for example, optical or magnetic disks, such as data storage device 306. Volatile media include dynamic memory, such as memory 306. Transmission media include coaxial cables, copper wire, and fiber optics, including the wires that comprise bus 308. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The embodiments of the present disclosure provide a system in which the processing load of electronic transactions from devices originating at a client remains with a client service point of the client, while any additional processing and information that is needed to process the electronic transactions is retrieved from a server on an on-demand or pre-scheduled basis. The system is scalable in that additional clients can be connected to a single server while the load of processing the electronic transactions from those additional clients remains predominantly with those additional clients. The system thereby allows for a faster processing response time as compared to systems where the processing of electronic transactions from clients occurs mainly with the server.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A device for processing electronic transactions, comprising:
   a processor configured to:
      receive, from a client processing device, a request for information to complete an electronic transaction by at least one user at an access device affiliated with an educational institution, the request for information triggered at the access device by an identification carrier;
      transmit, to the client processing device, a response to the request, the response configured to be transmitted by the client processing device to the access device and comprising at least one of a permission or denial whether to provide, to the at least one user, access to a physical space affiliated with the educational institution, permission or denial whether to provide access to electronic educational information, or determining at least one of a price and availability of an educational item to the at least one user; and
      transmit periodic updates to the client processing device to be used by the client processing device for responding to a plurality of subsequent requests for information to complete an electronic transaction until a next periodic update is received by the client processing device,
      wherein the processor is further configured to provide responses for requests for each of three types of electronic transactions: a permission or denial whether to provide to a user access to physical space, a permission or denial whether to provide access to electronic educational information, and determining at least one of a price and availability of an educational item to the user, and
      wherein at least one of the periodic updates comprises, for at least one of the three types of electronic transactions, a default response to be provided by the client processing device to respond to at least one of the plurality of subsequent requests for information when the client processing device does not receive a response to the at least one of the plurality of subsequent requests, or when a most recent periodic update does not include a response to the at least one of the plurality of subsequent requests.

2. The device of claim 1, wherein the identification carrier is an identification card configured to identify the at least one user.

3. The device of claim 1, wherein the processor is configured to receive a plurality of requests from a plurality of client processing devices.

4. The device of claim 1, wherein the at least one user is a student.

5. The device of claim 1, wherein the response to the request transmitted to the client processing device is configured to be stored by the client processing device for responding to subsequent instances of the request for information to complete an electronic transaction by at least one user at an access device affiliated with an educational institution, the request for information triggered at the access device by an identification carrier.

6. The device of claim 1, wherein the processor is further configured to determine, based on usage of a network connection with the client processing device, whether the network connection needs to be managed, and when the determination indicates the network connection with the client processing device needs to be managed, the processor is configured to at least one of delay transmission of the periodic update, or limit the periodic update to responses for frequently occurring requests.

7. A device for processing electronic transactions, comprising:
   a processor configured to:
      receive, from a server processing device, a response to a request for information to complete an electronic transaction by at least one user at an access device affiliated with an educational institution, the request for information triggered at the access device by an identification carrier;
      store, in memory, the response to the request, the response to the request comprising at least one of a permission or denial whether to provide, to the at least one user, access to a physical space affiliated with the educational institution, permission or denial whether to provide access to electronic educational information, or determining at least one of a price and availability of an educational item to the at least one user;
      transmit, to the access device, the response to the request;
      receive periodic updates from the server processing device to be used for responding to a plurality of subsequent requests for information to complete an electronic transaction until a next periodic update is received,
      wherein the processor is further configured to receive responses for requests for each of three types of electronic transactions: a permission or denial whether to provide to a user access to physical space, a permission or denial whether to provide access to electronic educational information, and determining at least one of a price and availability of an educational item to the user, and
      wherein at least one of the periodic updates comprises, for at least one of the three types of electronic transactions, a default response to respond to at least one of the plurality of subsequent requests for information when a response to the at least one of the plurality of subsequent requests is not received from the server processing device, or when a most recent periodic update does not include a response to the at least one of the plurality of subsequent requests.

8. The device of claim 7, further comprising a communications module configured to communicate, to the at least one user, a message indicating the response to the request.

9. The device of claim 7, wherein the processor is configured to transmit, to the server processing device, the request for information to complete the electronic transaction.

10. The device of claim 9, wherein the processor is configured to collect a plurality of requests for information to complete electronic transactions, and wherein the processor is further to transmit the plurality of requests, to the server processing device, at substantially the same time.

11. The device of claim 10, wherein the collected plurality of requests are not designated as urgent, and wherein an urgent request is excluded from collection for transmission with other requests.

12. The device of claim 7, wherein the processor is further configured to determine, based on usage of a network connection with the server processing device, whether the network connection needs to be managed, and when the determination indicates the network connection with the server processing device needs to be managed, the processor is configured to limit subsequent requests for information from the server processing device to frequently occurring requests.

13. The device of claim 7, wherein the processor is configured to transmit, to the server processing device, the request for information to complete the electronic transaction when the memory does not comprise the information to complete the electronic transaction, and when the memory comprises the information to complete the electronic transaction, the processor does not transmit the request for information to complete the electronic transaction to the server processing device.

14. A method for processing electronic transactions, comprising:
receiving, from a client processing device, a request for information to complete an electronic transaction by at least one user at an access device affiliated with an educational institution, the request for information triggered at the access device by an identification carrier;
transmitting, to the client processing device, a response to the request, the response configured to be transmitted by the client processing device to the access device and comprising at least one of a permission or denial whether to provide, to the at least one user, access to a physical space affiliated with the educational institution, permission or denial whether to provide access to electronic educational information, or determining at least one of a price and availability of an educational item to the at least one user; and
transmitting periodic updates to the client processing device to be used by the client processing device for responding to a plurality of subsequent requests for information to complete an electronic transaction until a next periodic update is received by the client processing device,
wherein the information transmitted to the client processing device indicates responses for requests for each of three types of electronic transactions: a permission or denial whether to provide to a user access to physical space, a permission or denial whether to provide access to electronic educational information, and determining at least one of a price and availability of an educational item to the user, and
wherein at least one of the periodic updates comprises, for at least one of the three types of electronic transactions, a default response to be provided by the client processing device to respond to at least one of the plurality of subsequent requests for information when the client processing device does not receive a response to the at least one of the plurality of subsequent requests, or when a most recent periodic update does not include a response to the at least one of the plurality of subsequent requests.

15. The method of claim 14, wherein the request for information is received at a server processing device, the method further comprising retrieving the response to the request at the server processing device.

16. The method of claim 14, further comprising:
receiving a plurality of requests from a plurality of client processing devices; and
transmitting, to the plurality of client processing devices, responses to the requests.

17. A method for processing electronic transactions, comprising:
receiving, from a server processing device, a response to a request for information to complete an electronic transaction by at least one user at an access device affiliated with an educational institution, the request for information triggered at the access device by an identification carrier;
storing, in memory, the response to the request, the response to the request comprising at least one of a permission or denial whether to provide, to the at least one user, access to a physical space affiliated with the educational institution, permission or denial whether to provide access to electronic educational information, or determining at least one of a price and availability of an educational item to the at least one user;
transmitting, to the access device, the response to the request;
receiving periodic updates from the server processing device to be used for responding to a plurality of subsequent requests for information to complete an electronic transaction until a next periodic update is received,
wherein the information received from the server processing device indicates responses for requests for each of three types of electronic transactions: a permission or denial whether to provide to a user access to physical space, a permission or denial whether to provide access to electronic educational information, and determining at least one of a price and availability of an educational item to the user, and
wherein at least one of the periodic updates comprises, for at least one of the three types of electronic transactions, a default response to respond to at least one of the plurality of subsequent requests for information when a response to the at least one of the plurality of subsequent requests is not received from the server processing device, or when a most recent periodic update does not include a response to the at least one of the plurality of subsequent requests.

18. The method of claim 17, further comprising communicating, to the at least one user, a message indicating the response to the request.

19. The method of claim 17, further comprising transmitting, to the server processing device, the request for information to complete the electronic transaction.

20. The method of claim 17, further comprising:
collecting a plurality of requests for information to complete electronic transactions; and transmitting the plurality of requests, to the server processing device, at substantially the same time.

21. A non-transitory machine-readable medium encoded with instructions for processing electronic transactions, the instructions comprising code for:
receiving, from a client processing device, a request for information to complete an electronic transaction by at least one user at an access device affiliated with an educational institution, the request for information triggered at the access device by an identification carrier; and
transmitting, to the client processing device, a response to the request, the response configured to be transmitted by the client processing device to the access device and comprising at least one of a permission or denial whether to provide, to the at least one user, access to a physical space affiliated with the educational institution, permission or denial whether to provide access to electronic educational information, or determining at least one of a price and availability of an educational item to the at least one user; and
transmitting periodic updates to the client processing device to be used by the client processing device for responding to a plurality of subsequent requests for information to complete an electronic transaction until a next periodic update is received by the client processing device,
wherein the information transmitted to the client processing device indicates responses for requests for each of three types of electronic transactions: a permission or denial whether to provide to a user access to physical space, a permission or denial whether to provide access to electronic educational information, and determining at least one of a price and availability of an educational item to the user, and
wherein at least one of the periodic updates comprises, for at least one of the three types of electronic transactions, a default response to be provided by the client processing device to respond to at least one of the plurality of subsequent requests for information when the client processing device does not receive a response to the at least one of the plurality of subsequent requests, or when a most recent periodic update does not include a response to the at least one of the plurality of subsequent requests.

22. A non-transitory machine-readable medium encoded with instructions for processing electronic transactions, the instructions comprising code for:
receiving, from a server processing device, a response to a request for information to complete an electronic transaction by at least one user at an access device affiliated with an educational institution, the request for information triggered at the access device by an identification carrier;
storing, in memory, the response to the request, the response to the request comprising at least one of a permission or denial whether to provide, to the at least one user, access to a physical space affiliated with the educational institution, permission or denial whether to provide access to electronic educational information, or determining at least one of a price and availability of an educational item to the at least one user; and
transmitting, to the access device, the response to the request;
receiving periodic updates from the server processing device to be used for responding to a plurality of subsequent requests for information to complete an electronic transaction until a next periodic update is received,
wherein the information received from the server processing device indicates responses for requests for each of three types of electronic transactions: a permission or denial whether to provide to a user access to physical space, a permission or denial whether to provide access to electronic educational information, and determining at least one of a price and availability of an educational item to the user, and
wherein at least one of the periodic updates comprises, for at least one of the three types of electronic transactions, a default response to respond to at least one of the plurality of subsequent requests for information when a response to the at least one of the plurality of subsequent requests is not received from the server processing device, or when a most recent periodic update does not include a response to the at least one of the plurality of subsequent requests.

23. A device for processing electronic transactions, comprising:
a processor configured to:
receive, from a client processing device, a request for information to complete an electronic transaction by at least one user at an access device affiliated with an educational institution, the request for information triggered at the access device by an identification carrier;
transmit, to the client processing device, a response to the request, the response configured to be transmitted by the client processing device to the access device and comprising at least one of a permission or denial whether to provide, to the at least one user, access to a physical space affiliated with the educational institution, permission or denial whether to provide access to electronic educational information, or determining at least one of a price and availability of an educational item to the at least one user; and
transmit periodic updates to the client processing device indicating a response for each of a plurality of subsequent requests for information to complete an electronic transaction, wherein each periodic update transmitted to the client processing device is configured to be used by the client processing device for responding to the plurality of subsequent requests for information to complete an electronic transaction until a next periodic update is received by the client processing device, and
wherein the processor is further configured to provide responses for requests for each of a permission or denial whether to provide to a user access to physical space, a permission or denial whether to provide access to electronic educational information, and determining at least one of a price and availability of an educational item to the user
wherein the processor is further configured to determine, based on usage of a network connection with the client processing device, whether the network connection needs to be managed, and when the determination indicates the network connection with the client processing device needs to be managed, the processor is configured to at least one of delay transmission of the periodic update, or limit the periodic update to responses for frequently occurring requests.

24. A device for processing electronic transactions, comprising:
a processor configured to:
receive, from a server processing device, a response to a request for information to complete an electronic transaction by at least one user at an access device affiliated with an educational institution, the request for information triggered at the access device by an identification carrier;

store, in memory, the response to the request, the response to the request comprising at least one of a permission or denial whether to provide, to the at least one user, access to a physical space affiliated with the educational institution, permission or denial whether to provide access to electronic educational information, or determining at least one of a price and availability of an educational item to the at least one user;

transmit, to the access device, the response to the request;

receive periodic updates from the server processing device indicating a response for each of a plurality of subsequent requests for information to complete an electronic transaction, wherein each periodic update received from the server processing device is configured to be used for responding to the plurality of subsequent requests for information to complete an electronic transaction until a next periodic update is received, and wherein the processor is further configured to receive responses for requests for each of a permission or denial whether to provide to a user access to physical space, a permission or denial whether to provide access to electronic educational information, and determining at least one of a price and availability of an educational item to the user, wherein the processor is further configured to determine, based on usage of a network connection with the server processing device, whether the network connection needs to be managed, and when the determination indicates the network connection with the server processing device needs to be managed, the processor is configured to limit subsequent requests for information from the server processing device to frequently occurring requests.

* * * * *